United States Patent [19]

Weber

[11] Patent Number: 5,766,338
[45] Date of Patent: Jun. 16, 1998

[54] ROAD BASE MATERIAL CONTAINING FLY ASH

[75] Inventor: LaVerne Weber, Elgin, Ill.

[73] Assignee: American Fly Ash Company, Naperville, Ill.

[21] Appl. No.: 592,253

[22] Filed: Jan. 26, 1996

Related U.S. Application Data

[63] Continuation of Ser. No. 95,869, Jul. 21, 1993, abandoned, which is a continuation-in-part of Ser. No. 801,062, Dec. 3, 1991, abandoned.

[51] Int. Cl.$^6$ .................... C04B 18/04; C04B 14/04
[52] U.S. Cl. .................... 106/705; 106/804; 106/802; 106/805; 106/DIG. 1; 264/DIG. 49; 404/71
[58] Field of Search .................... 106/705, DIG. 1, 106/706, 804, 805, 802; 264/DIG. 49; 404/71

[56] References Cited

U.S. PATENT DOCUMENTS

| | | | |
|---|---|---|---|
| 3,765,920 | 10/1973 | Humphrey | 106/DIG. 1 |
| 4,043,831 | 8/1977 | Friedman | 106/DIG. 1 |
| 4,050,950 | 9/1977 | Brewer et al. | 106/DIG. 1 |
| 4,374,672 | 2/1983 | Funston et al. | 106/DIG. 1 |
| 5,106,422 | 4/1992 | Bennett et al. | 106/DIG. 1 |
| 5,405,441 | 4/1995 | Riddle | 106/DIG. 1 |

*Primary Examiner*—Michael Marcheschi
*Attorney, Agent, or Firm*—Baker & McKenzie

[57] ABSTRACT

A way of using fly ash and water to make a road base material is disclosed. Class C fly ash, which sets up very quickly, is mixed with a hydrating liquid and compacted prior to initial set. To facilitate mixing, transportation and placement of the wet mixture, a set sequestering additive may be added to the water before mixing the water and the fly ash. Also disclosed is a mixing device designed to be attached to the underside of a tanker trailer of the type used to transport dry fly ash. The mixer introduces water to the inside and outside areas of a falling tubular stream of fly ash.

2 Claims, No Drawings

ROAD BASE MATERIAL CONTAINING FLY ASH

This is a Continuation of application Ser. No. 08/095,869 filed Jul. 21, 1993, now abandoned which is a continuation-in-part of application Ser. No. 07/801,062 filed Dec. 3, 1991 now abandoned.

BACKGROUND AND SUMMARY OF THE INVENTION

This invention relates to a method for the manufacture of road base material and synthetic aggregate. In particular, the present invention relates to road base materials and synthetic aggregate made from Class C fly ash.

"Aggregate", as referred to herein, is a term which includes natural aggregate, such as sand, gravel and crushed stone, as well as synthetic aggregate of various kinds, including lightweight aggregate such as cinders and aggregate produced through the combustion of pulverized powered coal. Generally, aggregate may be used in a variety of construction and landscaping applications. For example, aggregate is an essential ingredient in most concrete formulations, including both pre-cast and cast-in-place concrete. Aggregate is also used as a foundation material for paving, and as a backfill material. Aggregate is also used in landscaping applications in both a decorative and functional manner.

When used as a construction material, aggregate is frequently required to meet certain requirements relating to its physical and chemical characteristics. Those characteristics indicate the level of quality to which it conforms. Durability is one of the most significant elements of quality in aggregate. It is determined by tests which evaluate the aggregate's susceptibility to various types of degradation. A generally recognized industry standard for evaluating the ability of an aggregate to withstand abrasion is the test known as the "Los Angeles Abrasion Test", formerly referred to as the "Resistance To Abrasion of Small Size Coarse Aggregate by Use of the Los Angeles Machine—AASHTO Designation: T 96-83 (ASTM Designation: C 131-81). The Los Angeles Abrasion Test for smaller aggregate (less than 1.5 inches) is a measure of degradation of mineral aggregates of standard gradings resulting from the combination of actions including abrasion or attrition, impact, and grinding in a rotating steel drum containing a specified number of steel spheres, the number depending upon the grading of the test sample. As the drum rotates, a shelf plate picks up the sample and the steel spheres, carrying them around until they are dropped to the opposite side of the drum, creating an impact-crushing effect. The contents then roll within the drum with an abrading and grinding action until the shelf plate impacts and the cycle is repeated. After the proscribed number of revolutions, the contents are removed from the drum and the aggregate portion is sieved to measure the degradation as a percent loss.

The present invention relates to the use of fly ash as the main ingredient in the manufacture of a synthetic aggregate. Fly ash is the finely divided residue resulting from the combustion of ground or powdered coal, such as that which is produced in electricity generating power plants. It is collected as a fine particulate from the combustion gases before they are discharged into the atmosphere. Generally, there are two classes of fly ash, the composition of which is dependent upon the composition of the original combustible material from which it is derived. Class F fly ash is normally produced from anthracite or bituminous coal, and has pozzolanic properties, i.e. little or no cementitious value, but is capable of chemically reacting with calcium hydroxide to form compounds possessing cementitious properties. Class C fly ash is normally produced from lignite or sub-bituminous coal, and has some cementitious properties, in addition to pozzolanic properties.

Class C fly ash is known to be highly reactive when mixed with water, and flash setting (setting which occurs in about 2 minutes or less) will generally occur unless a reaction sequestering admixture is utilized. Use of Class C fly ash in the manufacture of lightweight aggregate and lightweight cement formulations has been suggested, for example, in U.S. Pat. Nos. 4,624,711, and 4,741,782,both to Styron, and 4,659,385 to Costopoluos et al. Styron suggests the use of Class C fly ash along with a foaming agent and an accelerator to make lightweight aggregate in a pelletizing process. Depending upon the type of fly ash used, Styron also recommends the addition of Portland cement. Costopoluos suggests the use of Class C fly ash to make a lightweight building material. Costopoluos suggests the use of air entraining and chemical foaming agents. The resulting lightweight aggregate will not conform to durability specifications for freeze-thaw and resistance to abrasion.

Generally, the prior art suggests the use of Class C fly ash only in the context of the manufacture of lightweight aggregate and lightweight cement products. The use of Class C fly ash is only mentioned in combination with foaming agents or other additives to decrease the density of the resulting product. In contrast, this invention focuses on increasing the density of material containing hydrated Class C fly ash.

It is an object of the present invention to produce an aggregate which can be used in place of standard natural aggregate.

It is another object of the present invention to produce an aggregate which is both strong and durable.

It is another object of the present invention to produce an aggregate which conforms to conventional aggregate specifications.

It is still another object of the present invention to produce an aggregate which is relatively simple and economical to manufacture.

Another object of the present invention is to produce an aggregate which does not require expensive additives or complicated formulations.

Yet another object of the present invention is to provide a method for making an aggregate which is simple and economical.

Yet another object of the present invention is to provide a method and composition which makes productive use of off-season and non-marketable fly ash.

A further object of the present invention is to provide an aggregate making method which efficiently and effectively utilizes Class C fly ash to make a non-lightweight aggregate.

Yet a further object of the present invention is to provide a road base composition which is durable and stable.

Still a further object of the present invention is to provide a method of forming a road base which is comprises primarily of Class C fly ash.

These and other objects of the present invention are achieved by the practice of a method whereby dry Class C fly ash is metered from a container. It then enters a mixing device where it is sprayed with a fine mist of water droplets. The rate at which the fly ash is metered from the container, and the rate of the addition of water is sufficient to produce a soil-like mixture. It is then distributed and uniformly consolidated, preferably by mechanical compaction, to densify the mixture. A relative density of greater than 95% of AASHTO T-180 is desired. The densified mixture is then allowed to cure to a hardened mass. Once hardened and after a pre-determined minimum time, the material is then broken or crushed into appropriately sized aggregate conforming to specific gradations established for conventional crushed aggregates. In the preferred embodiment, the compaction or consolidation of the mixture is completed before the mixture has had an initial set. In some cases, depending upon the composition of the fly ash and the amount of water added, the addition of a reaction sequestering admixture can be used to facilitate completion of the consolidation step prior to an initial set in order to achieve maximum consolidation. Depending upon the amount of water added to the fly ash, the use of vibration as a consolidation technique may be used. Once hardened, the material is then broken or crushed into appropriate sized aggregate. Alternatively, the homogenous mixture may be deposited at a location where a road is to be constructed. The mixture may be used as a course over poor subgrade in the construction of a roadway. Where lower water content is desired for purposes of increasing the strength of the aggregate or the road base material, physical compaction, as opposed to vibration, is the preferred consolidation technique.

The objects and advantages of the invention will be better understood by reading the following specification.

DETAILED DESCRIPTION OF THE INVENTION

Aggregate Manufacture

The first step is preparing an aggregate in accordance with the present invention requires the formation of an initial mixture. The initial mixture is generally comprised of fly ash and water. Fly ash is formed when pulverized coal is injected into a combustion chamber and a controlled ignition takes place. Temperatures in the chamber are approximately 2800° F. Fusion of the ignited particulate occurs in a highly turbulent environment. Lightweight glassy spheres are formed. They are removed from the exhaust system by means of electrostatic precipitators, and transferred pneumatically to dry collection silos. Class C fly ash is a generally fine material with typical particle sizes ranging from 0.25 to 200.00 microns.

Graphs I, II and III represent the grain size distribution of three different Class C fly ashes. Graphs IV, V and VI represent the distribution of mass in relation to particle size. The date indicate particle size can represent various mass differentials. Simply put, the large particles are more dense than small ones. All particles contain a glass shell. Small particles which contain interiors void of mass are sometimes identified as ashes. The large particles contribute both to volume and a denser mass. The particles and their associated mass distribution are important as this invention is discussed.

GRAPH I

```
Sample #1333-90
Low at   1  0.678         0   High at -128  196.0        0    Top of scale is      2457600
Graph of DIAM Size vs. Differential Volume From channel  1 to 127 skips 2

% >   Size    0        10       20       30       40       50       60       70       80       90      100
              I.........I........I........I........I........I........I........I........I........I........I
100.0  0.678 >*         .        .        .        .        .        .        .        .        .        .

99.88  0.775 > -*       .        .        .        .        .        .        .        .        .        .

99.61  0.886 >----*.    .        .        .        .        .        .        .        .        .        .

99.18  1.013 > - - -*   .        .        .        .        .        .        .        .        .        .

98.60  1.158 >--------* .        .        .        .        .        .        .        .        .        .

97.86  1.324 > - - - - - *        .        .        .        .        .        .        .        .        .

96.99  1.514 >-----------*        .        .        .        .        .        .        .        .        .

96.04  1.730 > - - - - - - *.     .        .        .        .        .        .        .        .        .

94.98  1.978 >--------------*.    .        .        .        .        .        .        .        .        .

93.81  2.262 > - - - - - - - - -* .        .        .        .        .        .        .        .        .

92.54  2.586 >-----------------* .         .        .        .        .        .        .        .        .

91.17  2.954 > - - - - - - - - - - *.      .        .        .        .        .        .        .        .

89.67  3.379 >---------------------*        .        .        .        .        .        .        .        .

88.03  3.863 > - - - - - - - - - - - -* .   .        .        .        .        .        .        .        .

86.30  4.417 >-----------------------* .    .        .        .        .        .        .        .        .

84.52  5.049 > - - - - - - - - - - - -*.    .        .        .        .        .        .        .        .

82.70  5.773 >------------------------*.    .        .        .        .        .        .        .        .

80.91  6.599 > - - - - - - - - - - - - *.   .        .        .        .        .        .        .        .

79.09  7.543 >-------------------------*.   .        .        .        .        .        .        .        .

77.25  8.625 > - - - - - - - - - - - - *     .        .        .        .        .        .        .        .
```

GRAPH I-continued

```
75.35  9.861 >------------------------*       .    .    .    .    .    .    .    .    .    .
73.39 11.27  > - - - - - - - - - - - -*        .    .    .    .    .    .    .    .    .    .
71.32 12.89 >--------------------------*  .    .    .    .    .    .    .    .    .    .    .
69.17 14.73  > - - - - - - - - - - - - -*     .    .    .    .    .    .    .    .    .    .
66.87 16.84 >-----------------------------*    .    .    .    .    .    .    .    .    .    .
64.38 19.26  > - - - - - - - - - - - - - - -* .    .    .    .    .    .    .    .    .    .
61.71 22.01 >--------------------------------*     .    .    .    .    .    .    .    .    .
58.75 25.17  > - - - - - - - - - - - - - - - - - -*   .    .    .    .    .    .    .    .
55.41 28.77 >------------------------------------*    .    .    .    .    .    .    .    .
51.83 32.89  > - - - - - - - - - - - - - - - - - - - -*   .    .    .    .    .    .    .
47.97 37.60 >----------------------------------------*.   .    .    .    .    .    .    .
43.86 42.99  > - - - - - - - - - - - - - - - - - - - - - -*   .    .    .    .    .    .
39.50 49.15 >----------------------------------------------*      .    .    .    .    .    .
34.84 56.19  > - - - - - - - - - - - - - - - - - - - - - - - - -*    .    .    .    .    .
29.75 64.24 >--------------------------------------------------*.    .    .    .    .    .
24.26 73.44  > - - - - - - - - - - - - - - - - - - - - - - - - - - -*    .    .    .    .
18.35 83.95 >----------------------------------------------------------*.    .    .    .
12.51 95.98  > - - - - - - - - - - - - - - - - - - - - - - - - - - - - - -*   .    .    .
7.200 109.7 >----------------------------------------------------------------*.    .    .
3.446 125.4  > - - - - - - - - - - - - - - - - - -*   .    .    .    .    .    .    .    .
1.331 143.4 >-------------------*.    .    .    .    .    .    .    .    .    .    .    .
0.292 164.0  > - - -*   .    .    .    .    .    .    .    .    .    .    .    .    .    .
0.010 187.4 >*    .    .    .    .    .    .    .    .    .    .    .    .    .    .    .
             |........|........|........|........|........|........|........|........|........|........|
%> Size      0       10       20       30       40       50       60       70       80       90      100
```

GRAPH II

Sample #2096-90
Low at   1  0.512        0   High at 128  182.7      0    Top of scale is     9830400
Graph of DIAM Size vs. Differential Volume From channel   1 to 127 skips 2

```
%>   Size   0       10       20       30       40       50       60       70       80       90      100
            |........|........|........|........|........|........|........|........|........|........|
100.0 0.512 >*    .    .    .    .    .    .    .    .    .    .    .    .    .    .    .
99.92 0.588  > *    .    .    .    .    .    .    .    .    .    .    .    .    .    .    .
99.74 0.676 >--*  .    .    .    .    .    .    .    .    .    .    .    .    .    .    .
99.47 0.777  > - -*.    .    .    .    .    .    .    .    .    .    .    .    .    .    .
99.06 0.872 >-----*    .    .    .    .    .    .    .    .    .    .    .    .    .    .
98.50 1.025  > - - - -*.   .    .    .    .    .    .    .    .    .    .    .    .    .
97.65 1.178 >------------*     .    .    .    .    .    .    .    .    .    .    .    .    .
96.54 1.353  > - - - - - - - -*     .    .    .    .    .    .    .    .    .    .    .    .
95.22 1.555 >-------------------*.   .    .    .    .    .    .    .    .    .    .    .
93.60 1.786  > - - - - - - - - - - -*     .    .    .    .    .    .    .    .    .    .
91.76 2.052 >------------------------*.   .    .    .    .    .    .    .    .    .    .
89.72 2.358  > - - - - - - - - - - - - -*    .    .    .    .    .    .    .    .    .    .
```

GRAPH II-continued

```
87.48  2.709 >-------------------------------*.       .    .    .    .    .    .    .    .    .    .
85.08  3.112 > -  -  -  -  -  -  -  -  -  -  -*    .    .    .    .    .    .    .    .    .    .
82.51  3.576 >--------------------------------*  .    .    .    .    .    .    .    .    .    .
79.80  4.109 > -  -  -  -  -  -  -  -  -  -  -  -*  .    .    .    .    .    .    .    .    .    .
76.82  4.720 >----------------------------------*    .    .    .    .    .    .    .    .    .
73.61  5.423 > -  -  -  -  -  -  -  -  -  -  -  -  -*  .    .    .    .    .    .    .    .    .
70.21  6.231 >-----------------------------------------*    .    .    .    .    .    .    .    .
66.58  7.159 > -  -  -  -  -  -  -  -  -  -  -  -  -  -*  .    .    .    .    .    .    .    .
62.70  8.225 >-------------------------------------------*    .    .    .    .    .    .    .
58.63  9.451 > -  -  -  -  -  -  -  -  -  -  -  -  -  -  -*  .    .    .    .    .    .    .
54.41  10.86 >---------------------------------------------*    .    .    .    .    .    .
49.88  12.48 > -  -  -  -  -  -  -  -  -  -  -  -  -  -  -  -*  .    .    .    .    .    .
45.02  14.33 >------------------------------------------------*.    .    .    .    .    .
39.92  16.47 > -  -  -  -  -  -  -  -  -  -  -  -  -  -  -  -  -*  .    .    .    .    .
34.81  18.92 >--------------------------------------------------*    .    .    .    .    .
29.79  21.74 > -  -  -  -  -  -  -  -  -  -  -  -  -  -  -  -  -  *  .    .    .    .    .
25.03  24.98 >---------------------------------------------------*.    .    .    .    .
20.81  28.70 > -  -  -  -  -  -  -  -  -  -  -  -  -  -  -  -  -*    .    .    .    .    .
17.23  32.97 >-------------------------------------------*    .    .    .    .    .    .
14.19  37.88 > -  -  -  -  -  -  -  -  -  -  -  -  -  -*  .    .    .    .    .    .    .
11.46  43.52 >-------------------------------*  .    .    .    .    .    .    .    .    .
9.120  50.00 > -  -  -  -  -  -  -  -  -  -*    .    .    .    .    .    .    .    .    .
7.129  57.45 >-----------------------*.    .    .    .    .    .    .    .    .    .    .
5.470  66.01 > -  -  -  -  -  -  -  -*.    .    .    .    .    .    .    .    .    .    .
4.099  75.84 >----------------*    .    .    .    .    .    .    .    .    .    .    .
2.917  87.13 > -  -  -  -  -  -*.    .    .    .    .    .    .    .    .    .    .    .
1.925  100.1 >------------*    .    .    .    .    .    .    .    .    .    .    .    .
1.144  115.0 > -  -  -  -*    .    .    .    .    .    .    .    .    .    .    .    .    .
0.570  132.1 >------*    .    .    .    .    .    .    .    .    .    .    .    .    .    .
0.179  151.8 > -  *.    .    .    .    .    .    .    .    .    .    .    .    .    .    .
0.011  174.4 >*    .    .    .    .    .    .    .    .    .    .    .    .    .    .    .

I.........I.........I.........I.........I.........I.........I.........I.........I.........I.........I
%>  Size  0       10       20       30       40       50       60       70       80       90      100
```

GRAPH III

Sample #1997-90
Low at  1  0.321        0   High at 128  193.8      0    Top of scale is    1228800
Graph of DIAM Size vs. Differential Volume From channel  1 to 127 skips 2

```
%>   Size  0       10       20       30       40       50       60       70       80       90      100
           I.........I.........I.........I.........I.........I.........I.........I.........I.........I.........I
100.0 0.321 >*    .    .    .    .    .    .    .    .    .    .    .    .    .    .    .

99.99 0.373 >*    .    .    .    .    .    .    .    .    .    .    .    .    .    .    .

99.95 0.434 >*    .    .    .    .    .    .    .    .    .    .    .    .    .    .    .

99.88 0.505 >  *    .    .    .    .    .    .    .    .    .    .    .    .    .    .    .
```

GRAPH III-continued

```
 99.74  0.588 >--*    .      .      .      .      .      .      .      .      .      .      .
 99.50  0.684 >- -*.    .      .      .      .      .      .      .      .      .      .
 99.11  0.795 >------*   .      .      .      .      .      .      .      .      .      .
 98.54  0.925 >- - - -*.    .      .      .      .      .      .      .      .      .
 97.77  1.076 >-----------*   .      .      .      .      .      .      .      .      .
 96.79  1.252 >- - - - - - -*   .      .      .      .      .      .      .      .      .
 95.61  1.457 >-----------------*.    .      .      .      .      .      .      .      .
 94.20  1.695 >- - - - - - - - - -*   .      .      .      .      .      .      .      .
 92.62  1.971 >----------------------*.    .      .      .      .      .      .      .
 90.85  2.293 >- - - - - - - - - - - -*   .      .      .      .      .      .      .
 88.91  2.668 >---------------------------*.    .      .      .      .      .      .
 86.80  3.103 >- - - - - - - - - - - - - -*   .      .      .      .      .      .
 84.56  3.610 >-------------------------------*.    .      .      .      .      .
 82.14  4.199 >- - - - - - - - - - - - - - - -*   .      .      .      .      .
 79.59  4.885 >-----------------------------------*.    .      .      .      .
 76.90  5.683 >- - - - - - - - - - - - - - - - - -*.    .      .      .      .
 74.07  6.611 >---------------------------------------*   .      .      .      .
 71.07  7.690 >- - - - - - - - - - - - - - - - - - - -*.    .      .      .
 67.86  8.946 >-------------------------------------------*.    .      .      .
 64.38  10.41 >- - - - - - - - - - - - - - - - - - - - - -*   .      .      .
 60.64  12.11 >-----------------------------------------------*.    .      .
 56.67  14.08 >- - - - - - - - - - - - - - - - - - - - - - - -*.    .      .
 52.53  16.38 >---------------------------------------------------*   .      .
 48.19  19.06 >- - - - - - - - - - - - - - - - - - - - - - - - - -*.    .
 43.67  22.17 >-------------------------------------------------------*   .
 38.95  25.79 >- - - - - - - - - - - - - - - - - - - - - - - - - - - -*.    .
 34.01  30.00 >-----------------------------------------------------------*   .
 28.92  34.90 >- - - - - - - - - - - - - - - - - - - - - - - - - - - - - -*   .
 23.96  40.60 >---------------------------------------------------------------*.
 19.30  47.23 >- - - - - - - - - - - - - - - - - - - - - - - - - - - - - - -*.
 15.11  54.94 >-----------------------------------------------------------*   .
 11.50  63.91 >- - - - - - - - - - - - - - - - - - - - - - - -*   .      .
 8.378  74.34 >---------------------------------------*   .      .      .
 5.757  86.48 >- - - - - - - - - - - - - - - - - - -*.    .      .      .
 3.577  100.6 >-------------------------*   .      .      .      .      .
 1.975  117.0 >- - - - - - - - -*.    .      .      .      .      .      .
 0.883  136.1 >-----------*   .      .      .      .      .      .      .
 0.248  158.4 >- - -*   .      .      .      .      .      .      .      .
 0.012  184.2 >-*    .      .      .      .      .      .      .      .      .

|.........|.........|.........|.........|.........|.........|.........|.........|.........|.........|
 %>  Size  0       10       20       30       40       50       60       70       80       90       100
```

GRAPH IV

Sample #1333-90
Low at 1 0.678        0   High at 120 137.2        0   Top of scale is       614400
Graph of DIAM Size vs. Differential Counts From channel 1 to 118 skips 2

```
%>     Size   0         10        20        30        40        50        60        70        80        90        100
              I.........I.........I.........I.........I.........I.........I.........I.........I.........I.........I
100.0  0.678 >*        .         .         .         .         .         .         .         .         .         .
91.12  0.775 >- - - - - - - - - - - - - - - - - - - -*         .         .         .         .         .         .
76.40  0.886 >--------------------------------------------------*        .         .         .         .         .
61.04  1.013 >- - - - - - - - - - - - - - - - - - - - - - - -*  .         .         .         .         .         .
47.08  1.158 >-------------------------------------------*      .         .         .         .         .         .
35.09  1.324 >- - - - - - - - - - - - - - - -*          .         .         .         .         .         .         .
25.65  1.514 >------------------------*       .         .         .         .         .         .         .         .
18.73  1.730 >- - - - - - - - - -*.           .         .         .         .         .         .         .         .
13.55  1.978 >---------------*.               .         .         .         .         .         .         .         .
9.728  2.262 >- - - - -*                      .         .         .         .         .         .         .         .
6.956  2.586 >--------*                       .         .         .         .         .         .         .         .
4.943  2.956 >- - -*                          .         .         .         .         .         .         .         .
3.476  3.379 >-----*.                         .         .         .         .         .         .         .         .
2.404  3.863 >- *  .                          .         .         .         .         .         .         .         .
1.643  4.417 >--*  .                          .         .         .         .         .         .         .         .
1.119  5.049 > *   .                          .         .         .         .         .         .         .         .
0.761  5.773 >*    .                          .         .         .         .         .         .         .         .
5.524  6.599 >*    .                          .         .         .         .         .         .         .         .
0.363  7.545 >*    .                          .         .         .         .         .         .         .         .
0.255  8.625 >*    .                          .         .         .         .         .         .         .         .
0.180  9.861 >*    .                          .         .         .         .         .         .         .         .
0.128  11.27 >*    .                          .         .         .         .         .         .         .         .
0.092  12.89 >*    .                          .         .         .         .         .         .         .         .
0.066  14.73 >*    .                          .         .         .         .         .         .         .         .
0.048  16.84 >*    .                          .         .         .         .         .         .         .         .
0.033  19.26 >*    .                          .         .         .         .         .         .         .         .
0.025  22.01 >*    .                          .         .         .         .         .         .         .         .
0.018  25.17 >*    .                          .         .         .         .         .         .         .         .
0.013  28.77 >*    .                          .         .         .         .         .         .         .         .
0.009  32.89 >*    .                          .         .         .         .         .         .         .         .
0.006  37.60 >*    .                          .         .         .         .         .         .         .         .
0.004  42.99 >*    .                          .         .         .         .         .         .         .         .
0.003  49.15 >*    .                          .         .         .         .         .         .         .         .
0.002  56.19 >*    .                          .         .         .         .         .         .         .         .
0.001  64.24 >*    .                          .         .         .         .         .         .         .         .
0.001  73.44 >*    .                          .         .         .         .         .         .         .         .
0.000  83.95 >*    .                          .         .         .         .         .         .         .         .
0.000  95.98 >*    .                          .         .         .         .         .         .         .         .
0.000  109.7 >*    .                          .         .         .         .         .         .         .         .
```

GRAPH IV-continued

```
0.000  125.4 >*         .        .        .        .        .        .        .        .        .        .

|.........|.........|.........|.........|.........|.........|.........|.........|.........|.........|
% >  Size  0       10       20       30       40       50       60       70       80       90      100
```

GRAPH V

Sample #2096-90
Low at   1  0.512         0   High at 122  138.4      0   Top of scale is     2437600
Graph of DIAM Size vs. Differential Counts From channel   1 to 121 skips 2

```
% >   Size   0       10       20       30       40       50       60       70       80       90      100
             |.........|.........|.........|.........|.........|.........|.........|.........|.........|.........|
100.0 0.512 >*       .        .        .        .        .        .        .        .        .        .
92.35 0.588 >- - - - - - - - - - - - - - - - - - - - - - - - - - - - - - - -*     .        .        .        .
80.63 0.676 >------------------------------------------------------------------*    .        .        .
69.13 0.777 >- - - - - - - - - - - - - - - - - - - - - - - - - - - - - - -*     .        .        .        .
58.13 0.892 >-----------------------------------------------------------*.        .        .        .
47.45 1.025 >- - - - - - - - - - - - - - - - - - - - - - - - - - - - -*     .        .        .        .
37.01 1.178 >---------------------------------------------------*.        .        .        .        .
28.16 1.353 >- - - - - - - - - - - - - - - - - - - - - - -*     .        .        .        .        .
20.95 1.555 >---------------------------------------*.        .        .        .        .        .
15.22 1.786 >- - - - - - - - - - - - - -*.        .        .        .        .        .        .
10.91 2.052 >---------------------*        .        .        .        .        .        .        .
7.752 2.358 >- - - - - - - -*     .        .        .        .        .        .        .        .
5.466 2.709 >-----------*        .        .        .        .        .        .        .        .
3.852 3.112 >- - - -*.        .        .        .        .        .        .        .        .
2.712 3.576 >-----*        .        .        .        .        .        .        .        .        .
1.918 4.109 >- - *.        .        .        .        .        .        .        .        .        .
1.345 4.720 >-- *        .        .        .        .        .        .        .        .        .
0.936 5.423 > - *        .        .        .        .        .        .        .        .        .        .
0.651 6.231 >- *        .        .        .        .        .        .        .        .        .        .
0.450 7.159 >  *        .        .        .        .        .        .        .        .        .        .
0.309 8.225 >*        .        .        .        .        .        .        .        .        .        .
0.211 9.451 >*        .        .        .        .        .        .        .        .        .        .
0.144 10.86 >*        .        .        .        .    ·    .        .        .        .        .        .
0.097 12.48 >*        .        .        .        .        .        .        .        .        .        .
0.063 14.33 >*        .        .        .        .        .        .        .        .        .        .
0.040 16.47 >*        .        .        .        .        .        .        .        .        .        .
0.025 18.92 >*        .        .        .        .        .        .        .        .        .        .
0.015 21.74 >*        .        .        .        .        .        .        .        .        .        .
0.008 24.98 >*        .        .        .        .        .        .        .        .        .        .
0.005 28.70 >*        .        .        .        .        .        .        .        .        .        .
0.003 32.97 >*        .        .        .        .        .        .        .        .        .        .
0.002 37.88 >*        .        .        .        .        .        .        .        .        .        .
0.001 43.52 >*        .        .        .        .        .        .        .        .        .        .
0.000 50.00 >*        .        .        .        .        .        .        .        .        .        .
```

GRAPH V-continued

```
0.000  57.45 >*     .    .    .    .    .    .    .    .    .    .    .
0.000  66.01 >*     .    .    .    .    .    .    .    .    .    .    .
0.000  75.84 >*     .    .    .    .    .    .    .    .    .    .    .
0.000  87.13 >*     .    .    .    .    .    .    .    .    .    .    .
0.000  100.1 >*     .    .    .    .    .    .    .    .    .    .    .
0.000  115.0 >*     .    .    .    .    .    .    .    .    .    .    .
0.000  132.1 >*     .    .    .    .    .    .    .    .    .    .    .
            |.......|.......|.......|.......|.......|.......|.......|.......|.......|.......|
%>   Size   0   10   20   30   40   50   60   70   80   90   100
```

GRAPH VI

Sample #1997-90
Low at   1  0.321        0   High at 116  105.8        0    Top of scale is      614400
Graph of DIAM Size vs. Differential Counts From channel   1 to 115 skips 2

```
%>   Size   0          10         20         30         40         50         60         70         80         90         100
            |..........|..........|..........|..........|..........|..........|..........|..........|..........|..........|
100.0  0.321 >*
96.31  0.375 >- - - - - - - - - - - *
90.13  0.434 >----------------------------------*
81.89  0.505 >- - - - - - - - - - - - - - - - - - - *
71.80  0.588 >------------------------------------------------------*
60.41  0.686 >- - - - - - - - - - - - - - - - - - - - - - - - - - *
48.60  0.795 >------------------------------------------------------*
37.58  0.925 >- - - - - - - - - - - - - - - - - - - -*
28.25  1.076 >-----------------------------------*
20.64  1.252 >- - - - - - - - - - - - - - - -*
14.76  1.457 >-----------------------*
10.34  1.695 >- - - - - - - - -*
7.179  1.971 >-------------*
4.923  2.295 >- - - - -*
3.348  2.668 >------*
2.263  3.103 >- - *
1.530  3.610 >---*
1.028  4.199 >  *
0.691  4.885 >-*
0.465  5.683 >*
0.314  6.611 >*
0.213  7.690 >*
0.144  8.946 >*
0.096  10.41 >*
0.064  12.11 >*
0.042  14.08 >*
0.028  16.38 >*
0.018  19.06 >*
```

GRAPH VI-continued

```
0.012  22.17 >*    .    .    .    .    .    .    .    .    .    .    .    .    .    .    .    .    .    .    .    .
0.007  25.79 >*    .    .    .    .    .    .    .    .    .    .    .    .    .    .    .    .    .    .    .    .
0.004  30.00 >*    .    .    .    .    .    .    .    .    .    .    .    .    .    .    .    .    .    .    .    .
0.003  34.90 >*    .    .    .    .    .    .    .    .    .    .    .    .    .    .    .    .    .    .    .    .
0.002  40.60 >*    .    .    .    .    .    .    .    .    .    .    .    .    .    .    .    .    .    .    .    .
0.001  47.23 >*    .    .    .    .    .    .    .    .    .    .    .    .    .    .    .    .    .    .    .    .
0.000  54.94 >*    .    .    .    .    .    .    .    .    .    .    .    .    .    .    .    .    .    .    .    .
0.000  63.91 >*    .    .    .    .    .    .    .    .    .    .    .    .    .    .    .    .    .    .    .    .
0.000  74.34 >*    .    .    .    .    .    .    .    .    .    .    .    .    .    .    .    .    .    .    .    .
0.000  86.48 >*    .    .    .    .    .    .    .    .    .    .    .    .    .    .    .    .    .    .    .    .
0.000  100.6 >*    .    .    .    .    .    .    .    .    .    .    .    .    .    .    .    .    .    .    .    .
       I........I........I........I........I........I........I........I........I........I........I
%>  Size  0    10    20    30    40    50    60    70    80    90    100
```

Class C fly ash as outlined by ASTM C-618 and AASHTO M-295 contain primary elements such as silica, alumina, iron, calcium, magnesium and sulfur. They are reported as oxides. The analysis of three typical Class C fly ashes are shown in Table I below.

TABLE I

Typical Class C Fly Ash Analysis

| | | | |
|---|---|---|---|
| $SiO_2$ | 34.00 | 39.10 | 32.00 |
| $Al_2O_3$ | 18.90 | 21.20 | 18.70 |
| $Fe_2O_3$ | 6.13 | 5.71 | 5.90 |
| Sum* | 59.03 | 66.01 | 56.60 |
| CaO | 26.70 | 21.80 | 27.20 |
| MgO | 5.51 | 4.32 | 5.47 |
| $SO_3$ | 2.00 | 1.78 | 2.77 |

*Sum of the above three components

When water is introduced to the fly ash, an exothermic reaction occurs. It can be generally described as a hydration similar to that found in portland cement mixtures. An absence of gypsum type retarding compounds creates a rapid or flash set that may occur within minutes of the addition of water. This is principally a function of the quantity of tricalcium aluminate and anhydride present in the Class C fly ash. Water activates the lime creating alkali contents which influence the hydration reaction. The alkali solution facilitates the assault on various fly ash particles in the aqueous solution. Particle size and mass discussed earlier become significant as the single shelled small particles break down and become available to the hydration process quickly as the tricalcium aluminate and anhydride react. Two typical hydration products found in Class C fly ash mixtures are described in either an AFt or AFm category. The AFt is a tri-substituted calcium sulfo aluminate phase generally described by the following formula:

$$Ca_6(Al, Fe)_2(X)_3(Y)_{12}.ZH_2O$$

where many divalent ($X^{2+}$) and monovalent ($Y^{-1}$) anion substitutions are found.

This phase creates an ettringite-like composition, $Ca_6 AL_2 (SO_4)_3(OH)_{12}.25H_2O$, which forms in the early stage of hydration when the concentration of sulfate in the pore solution is high. Unfortunately, ettrigite generally is not stable at low concentrations of sulfate.

In the AFm category, a monosubstituted calcium alumino sulfate is present. It can generally be described by the formula:

$$Ca_4(Al, Fe)_2(X)_1(Y)_{12}.ZH_2O$$

where X is a divalent anion, Y a monovalent anion and Z depends on the nature of X and Y. Monosulfoaluminate $(Ca_4Al_2(So_4)(OH)_{12}.(6H_2O)$ forms when the sulfate content of the solution if low. Straetlignite formations occur when fly ash glass breaks down slowly, freeing ions as a function of the highly alkaline solution. This does not commonly occur as most fly ashes contain insufficient quantities of anhydride to retard the tricalcium aluminate. A focus of this invention is the promotion and formulation of stable ettringite and straetlignite compounds. The present invention accomplishes this with the use of an admixture like those used to retard the set of portland cement. It is believed that any sugar based admixture will be usable. Lignosites, both calcium and sodium, are also usable to effectively sequester or retard the setting process. However, a preferred set sequestering admixture is sodium-glucoheptonate. By use of such an admixture, in effect, the movement of ions associated with the calcium is sequestered for a period of time, allowing mixing and consolidation to take place prior to initial set. A parallel benefit is the slow liberation of ions from the fly ash glass in a controlled alkaline solution. Fly ash particle distribution, elemental composition, physical manipulation of the mixture, and resulting aggregate characteristics are effected by adjustments to the treatment rates of admixture and water content as shown in Table 2 below:

TABLE 2

| MIX # | (WATER TO FLY ASH RATIO) | ADMIXTURE DOSAGE (OZ/100 LBS) | FINAL SET TIME (MINUTES) | COMPRESSIVE STRENGTH (psi) | |
|---|---|---|---|---|---|
| | | | | 3-DAY | 7-DAY |
| 1 | 0.27 | none | 10 | 1720 | 3910 |
| 2 | 0.27 | 3.8 | >300 | 90 | 430 |
| 3 | 0.15 | 3.8 | 105 | 440 | 4140 |
| 4 | 0.21 | 3.8 | >300 | 180 | 230 |

As can be seen from Table 2, variable results can occur. Variability usually results from the difficulty in achieving sufficient compaction. Mixes with lower water content are more easily compacted by mechanical compaction methods. Mixes with high water content are more easily compacted by vibratory compaction. Mixes with mid-range water content (about 16% to 22%) are less easily compacted by either mechanical or vibratory methods.

Water is required to initiate the reaction and hydration in the aqueous solution previously discusses. Uniform distribution of water in the mixture is difficult to achieve because of the fly ash's infinity for water, resulting in agglomeration. Coverage of as much of the surface area of each individual fly ash particle as possible is desirable. Spray nozzles which create an atomized water droplet are required to facilitate the desirable aqueous pore solution. The Median Volume Diameter (M.V.D.) of water droplets used to hydrate the fly ash should be between about 2000 and about 8000 microns, and should preferably be about 5000 microns or less. Hydraulically and pneumatically atomized systems are two which are commonly used. Others may be used subject to production of droplets conforming to the preferred M.V.D.

In order to create the aqueous solution, a minimum water requirement is about 10% as determined by the dry weight of fly ash. Fly ash used in the present invention may be supplied from current production at temperatures of 150° F. Evaporation must be taken into consideration to insure availability of water at curing. Typically, an 11% to 13% addition rate is preferred in order to produce the desired soil-like consistency.

Alternative methods of mixing include blade mixing with a motor grader which may be used when sufficient working area is available. In order to achieve mixing with a motor grader, a reaction sequestering period of about 3 to 5 minutes will generally be required after the mixture is deposited on the ground. Such mixing can generally be accomplished with about 3 to 5 passes of the motor grader. This technique requires substantial skill in accomplishing the required uniformity in the mixture of fly ash and water. Agglomeration is prevalent, making difficult the production of a homogeneous mixture required to produce the quality level of aggregate described in this invention.

A horizontal rotary mixer/unloader, such as are commonly used to condition fly ash with the introduction of about 2% to 5% moisture, may be used to achieve incorporation of fly ash and water in the initial mixture of the present invention.

The motor grader and horizontal mixer techniques described above are examples of many mixing options which may be employed. Other such techniques include the use of turbine mixers, ribbon mixers, plow mixers, pug mixers and pin mixers.

Once mixing of the fly ash and water to a generally homogeneous state has been achieved, the homogeneous mixture must be consolidated. It is important that consolidation occur prior to an initial set of the mixture. It has been found that compaction or consolidation after initial set has taken place may lead to misleading results. For example, compaction which occurs after initial set may result in samples which show acceptable levels of compressive strength. However, when these samples are crushed into aggregate, the resulting material may not have sufficient resistance to abrasion to meet the desired specifications as set forth in the Los Angeles Abrasion Test. Compaction or consolidation after initial set can produce a mechanical interlock which will produce levels of compressive strength in uncrushed samples which are apparently acceptable. However, once the apparently acceptable samples are crushed into individual pieces of aggregate, the mechanical interlock which was responsible for the compressive strength is no longer present. The strength of the individual pieces of aggregate made from material compacted after initial set are, in fact, inferior.

Depending upon the water content of the mixture, compaction or vibration may be used as a consolidation technique. Water content of mixtures which may be used in accordance with the present invention may be as high as about 22%. It has been found that with water content of approximately 19% (by weight) or greater, vibratory consolidation techniques may be used. However, when water content is about 19% or below, physical compaction is the preferred form of consolidation.

The following are examples of mixtures which have produced an aggregate with acceptable durability, i.e. with durability of less than 40% degradation as measured by the Los Angeles Abrasion Test:

EXAMPLE 1:

| Component: | Parts: |
| --- | --- |
| Class C fly ash | 100 |
| Class F fly ash | 0 |
| Water | 12 |
| Sodium-glucoheptonate | 3.5 oz per cwt |

The mixture of example 1 produces a soil-like mixture which requires the use of compaction as a consolidation technique. Density of the compacted mass significantly effects the ultimate strength and durability of the resulting aggregate. Field densities of the compacted mass prior to initial set must be greater than or equal to a relative density of 90% as determined by AASHTO T-180 Method A modified to three lifts.

Synthetic aggregates produced from the present invention have unique properties and characteristics not found in conventional aggregates. Certain amounts of unhydrated silica, alumina, iron, calcium and magnesium are present on the exterior of the crushed aggregate particles. In the presence of water, they will hydrate in a chemical process, essentially the same as described previously, forming a cemented interface between the aggregate particles. Such cemented interfaces occur when the aggregate of the present invention is used in the traditional cement/aggregate mixtures and when used as stabilized aggregate, such as road base material. This matrix will enhance the conventional mechanical interlock of the aggregate particles. Strength development as determined from specimens created by AASHTO T-180 Method A modified to three lifts and cured at 72° F. in sealed containers for 14 and 28 days produced strength improvement. Strength improvement can be further augmented with the aid of supplemental calcium bearing materials. Kiln dust collected from rotary kilns in cement (Cement Kiln Dust—CKD) or lime (Lime Kiln Dust—LKD) manufacture are examples. Dry Class C fly ash may also be added to the rock gradation. When either supplemental sources are used, the addition of water is required to promulgate the hydration process. Homogeneity of the mix is accomplished by means of a mechanical mixer, i.e. pug mill, rotary mixing or in-place recycler. Table 3 below summarizes typical improvements resulting from these supplements:

TABLE 3

Strength Development of Stabilized Synthetic Aggregate

| MIX # | TREATMENT RATE | TREATMENT ADDITIVE | 14 DAY psi | 28 DAY psi |
|---|---|---|---|---|
| 1 | 0% | none | 189 | 225 |
| 2 | 3% | LKD | 414 | 624 |
| 3 | 6% | LKD | 1066 | 1595 |
| 4 | 9% | LKD | 1608 | 2031 |
| 5 | 3% | Type N Lime | 1588 | 2616 |
| 6 | 3% | Class C Fly Ash | 125 | 228 |
| 7 | 6% | Class C Fly Ash | 220 | 283 |

Pozzolanic properties of aggregate produced from the present invention can be utilized in plastic concrete type mixers. The small fraction can be sized to gradations currently acceptable in the industry. Low strength, flowable backfill mixtures containing synthetic sand of the present invention exhibit superior strength development when compared to natural sand. The results are shown in Tables 4A and 4B below, which show the strength development of flowable fill mixtures of natural sand compared to mixtures of synthetic sand made in accordance with the present invention:

TABLE 4A

Mix Design
(Aggregate Size < ⅛ inch)

| INGREDIENT | | NATURAL SAND | | SYNTHETIC SAND | |
|---|---|---|---|---|---|
| | | Mix 1 | Mix 2 | Mix 3 | Mix 4 |
| Cement (Portland - Type I) | lb./yd | 50 | 50 | 50 | 50 |
| Fly Ash Class F | lb./yd | 300 | — | 300 | — |
| Fly Ash Class C | lb./yd | — | 200 | — | 200 |
| Fine Aggregate | lb./yd | 2900 | 2900 | 2239 | 2239 |
| Water | lb./yd | 463 | 456 | 500 | 432 |

TABLE 4B

Strength

| | COMPRESSIVE STRENGTHS (psi) | | | |
|---|---|---|---|---|
| AGE (days) | Mix 1 | Mix 2 | Mix 3 | Mix 4 |
| 1 | 0 | 24 | 208 | 204 |
| 7 | 52 | 36 | 357 | 428 |
| 14 | 56 | 45 | 420 | 580 |
| 28 | 103 | 97 | 482 | 638 |
| 56 | 90 | 123 | 521 | 783 |
| 90 | 95 | 151 | 547 | 813 |

Another unique characteristic of aggregate produced from the present invention is the internal pore structure. The micro structure is similar to that found in portland cement concrete. It is created as a result of escaping gases from hydration which are entrapped as a function of consolidation prior to set and subsequent hardening of the mass. This contribution to aggregate quality is manifested in favorable resistance to degradation when subjected to freeze-thaw tests prescribed in AASHTO T-103 Methods A and C.

EXAMPLE 2

| Component: | Parts: |
|---|---|
| Class C fly ash | 100 |
| Class F fly ash | 0 |
| Water | 19 |
| Admixture | 0 |

The sample of Example 2 was consolidated by using a vibrating table. The resulting material had a unit weight of approximately 130 lbs. per cubic foot. The samples produced by Example 2 also produced an aggregate which passed the less then 40% degradation as required by the Los Angeles Abrasion Test (Grading A).

The range of proportions that will produce an acceptable aggregate are those which are made from mixtures comprised as follows:

| Components: | Parts: |
|---|---|
| Class C fly ash | 80 to 100 |
| Class F fly ash | 0 to 20 |
| Water | 10 to 20 |
| Admixture | 0 to 20 oz. per cwt of dry fly ash |

Road Base Constuction

As described above, the fly ash and water mixture, with the possible addition of a set sequestering admixture, hardens to a rigid mass which has substantial compressive strength. The strength of the material is enhanced if the mixture is compacted prior to the time when substantial portions of the fly ash and water have chemically reacted. Instead of being crushed into aggregate as described above, the mixture may be placed as a road base material. However, since a fly ash and water mixture tends to set and harden very rapidly, care must be taken to ensure that either a sufficient amount of set sequestering admixture is added to the mixture or the fly ash and water are combined at a location close to where the road is being made so that placement and compaction of the mixture can be accomplished prior to initial set.

One possible method of using the fly ash and water mixture as a road base is to use a site remote from the place where the road to be built (the "remote site method"). For example, a mixer may be installed at a power plant where fly ash is generated and stockpiled. The mixture may be formed by use of a mixer which is adjacent to, and preferably beneath, a fly ash storage silo. Depending on whether a constant and high volume source of water is available, the mixture can be made by a batch or by an in-line technique.

In a batch version of the remote site method, admixture is added to water contained in a tank or multiple tanks. The amount of admixture will vary depending upon the amount of time required to transport the fly ash/water mixture to a road construction site. It has been found that when a refined sodium glucoheptonate is used as the set sequestering admixture between about 0 and about 7.5 ounces of admixture per 100 lbs. of dry fly ash should be used. The treatment rate is a function of the time required before placement and compaction can be completed. While the amount of admixture will generally depend on the amount of travel time which is required to transport the mixture from the silo to the road construction site, other factors, such as traffic and other possible sources of delay, should be considered in determining the amount of admixture.

If a good supply of sufficient quantities of water (i.e. at substantial and constant pressure) is available at a power plant or silo location, admixture can be added to the water as it is added to a mixture with the fly ash. This is an in-line version of the remote site method. The water line should be equipped with an in-line diffuser, which thoroughly mixes the water and admixture prior to their being added to the mixer. Flow meters may be used to measure the amount of admixture and water being added to a mixer. The rates of fly ash, water and admixture are all monitored to ensure the proper proportions. Again, the amount of admixture required will depend on the time needed to transport the mixture to a road construction site. However, it has been found that between about 10.5 lbs. and about 18 lbs. of water per hundred lbs. dry fly ash produces an excellent road base composition when compacted prior to initial set.

As discussed above with respect to the preparation of a mixture which is allowed to harden and subsequently crushed into aggregate, the amount of water, admixture and fly ash which should be combined will also depend to some extent on the characteristics of the fly ash available and the kinds of fly ash used, if more than one type of fly ash is used.

Once the mixture has been prepared in a mixer, in the same manner as described above with respect to the formation of aggregate, it is loaded into a dump truck and transported to a road construction site. A typical road base spreader, such as the Model R600 B spreader sold by Rivinus of Eureka, Ill., is mounted to a track-type dozer with a straight or angled blade.

After the mixture is spread, the mixture is compacted before the water and fly ash have completed their chemical reaction, and preferably before such reaction has begun, or before a substantial amount of water and fly ash have reacted.

An alternate method for mixing and placing the fly ash and water mixture as a road base material in which the fly ash and water are mixed as they are placed on the road bed is known as the "on-site method".

The compaction of the fly ash and water mixture in the on-site method is preferably done with a vibratory roller such as ones sold by BOMAG Gas Models BW213D and BW213PD, may be used to compact . The extent of compaction is preferable to a density of 95% of AASHTO T-180.The resulting density of the roadbase material should be between about 125 and about 140 pounds per cubic foot. To verify that the field density of the roadbase material after being placed is in accordance with the density requirements as stated herein, one of the three AASHTO-approved materials, i.e. the Rubber Balloon Method No. T 205-86,the Sand Cone Method, No. T 191-86, the Drive Cylinder Method No. T 204-86 and the Nuclear Method No. T 238-86, for field testing in-place density should be used.

Depending upon the quality of the sub-grade soil and its CBR (California Bearing Ratio) rating, more than one course of the fly ash and water mixture may be required to create a satisfactory road base made of the mixture of the present invention. For example, if the natural soil existing on the site is loose, a course of about 4 inches may be placed to initially stabilize the soil. A second thicker course of about 8 inches may then be placed to complete the road base. One or more additional courses, including the surface course, will then be applied to complete the road construction.

It should be noted that the terms "compaction" and "consolidation" as used herein are references to large-scale methods of densifying a layer of material and specifically to methods which employ heavy equipment, such as the methods and equipment referred to in Sections 300 of the Illinois Department of Transportation publication entitled, "Standard Specifications for Road and Bridge Constructions."

The equipment specified therein includes tamping rollers, pneumatic-tired rollers, three-wheeled rollers, tandem rollers, spreader and vibratory machines, which would include the BOMAG machines described above.

While a specific embodiment of the invention has been shown and described, it will be apparent to those skilled in the art that numerous alternatives, modifications, and variations of the embodiment shown can be made without departing from the spirit and scope of the appended claims.

I claim:

1. A road base comprising at least one layer of compacted material deposited upon and overlying a subgrade of soil, said material being compacted by a vibratory roller to a density of about 95 percent, and having a resulting density of between about 125 and about 140 pounds per cubic foot, said material consisting essentially of a compacted unfired mixture of fly ash and a hydrating fluid, said fly ash being selected from a group consisting of Class C fly ash, and a combination of Class C fly ash and Class F fly ash, said hydrating fluid being selected from the group consisting of water and water together with set sequestering admixture, said admixture being selected from the group consisting of sodium glucoheptonate, sodium lignosite, and calcium lignosite, said mixture containing amounts of water and fly ash within the following ranges:

100 parts fly ash (Class C)

10–18 parts water said parts being approximate and based upon weight, the amount of said admixture not exceeding approximately 7.5 ounces per 100 pounds of fly ash, said mixture being compacted prior to initial set.

2. A road base in accordance with claim 1 wherein:

said admixture is sodium glucoheptonate.

* * * * *